(12) United States Patent
Matsunawa

(10) Patent No.: US 12,018,962 B2
(45) Date of Patent: Jun. 25, 2024

(54) RESOLVER

(71) Applicant: MABUCHI MOTOR CO., LTD., Chiba (JP)

(72) Inventor: Akira Matsunawa, Chiba (JP)

(73) Assignee: MABUCHI MOTOR CO., LTD., Chiba (JP)

( * ) Notice: Subject to any disclaimer, the term of this patent is extended or adjusted under 35 U.S.C. 154(b) by 0 days.

(21) Appl. No.: 18/256,425

(22) PCT Filed: Dec. 10, 2021

(86) PCT No.: PCT/JP2021/045687
§ 371 (c)(1),
(2) Date: Jun. 8, 2023

(87) PCT Pub. No.: WO2022/124415
PCT Pub. Date: Jun. 16, 2022

(65) Prior Publication Data
US 2024/0035857 A1 Feb. 1, 2024

(30) Foreign Application Priority Data
Dec. 11, 2020 (JP) ................. 2020-205915

(51) Int. Cl.
*G01D 5/20* (2006.01)
*G01B 7/30* (2006.01)

(52) U.S. Cl.
CPC ....... *G01D 5/20* (2013.01); *G01B 7/30* (2013.01)

(58) Field of Classification Search
CPC .................... G01D 5/20; G01B 7/30
See application file for complete search history.

(56) References Cited

U.S. PATENT DOCUMENTS 5,708,344 A * 1/1998 Hayashi ............... G08C 19/40
                                                        318/605
6,239,571 B1   5/2001 Shimahara
(Continued)

FOREIGN PATENT DOCUMENTS

GB    2520896 A    6/2015
JP    S59185946 U  12/1984
(Continued)

OTHER PUBLICATIONS

International Search Report in PCT Application No. PCT/JP2021/045687 dated Feb. 8, 2022, 7pp.
(Continued)

*Primary Examiner* — Reena Aurora
(74) *Attorney, Agent, or Firm* — HAUPTMAN HAM, LLP

(57) ABSTRACT

A resolver includes an excitation coil provided at the rotor or the stator and formed on a sheet-shaped substrate, and a detection coil provided at the rotor or the stator and formed on the sheet-shaped substrate. At least one of the excitation coil and the detection coil is a sine coil and a cosine coil. In the sine coil, sine coil patterns of a pair of comb-shaped closed coils are disposed on the identical layer of the substrate. In the cosine coil, cosine coil patterns of a pair of comb-shaped closed coils are disposed on the identical layer of the substrate. Each of the pair of comb-shaped closed coils includes a first comb-shaped closed coil including an inward first projection and a second comb-shaped closed coil including an outward second projection.

8 Claims, 9 Drawing Sheets

(56) References Cited

U.S. PATENT DOCUMENTS 8,860,405 B2 * 10/2014 Kino .................. G01D 5/00
                                                              324/207.25
10,035,535 B2 * 7/2018 Ohira ................ B62D 15/02

FOREIGN PATENT DOCUMENTS

| JP | S62058847 A | 3/1987 |
| JP | 2000292205 A | 10/2000 |
| JP | 2015012234 A | 1/2015 |
| JP | 2017090431 A | 5/2017 |
| JP | 2019200106 A | 11/2019 |
| JP | 2020003232 A | 1/2020 |
| WO | 2014037024 A1 | 3/2014 |

OTHER PUBLICATIONS

Written Opinion in PCT Application No. PCT/JP2021/045687 dated Feb. 8, 2022, 9pp.

* cited by examiner

RESOLVER

RELATED APPLICATIONS

The present application is a National Phase of International Application Number PCT/JP2021/045687 filed Dec. 10, 2021, which claims the benefit of priority from Japanese Patent Application No. 2020-205915, filed on Dec. 11, 2020.

TECHNICAL FIELD

The present invention relates to a resolver that detects a rotation angle of a rotor with respect to a stator.

BACKGROUND ART

In the related art, as one of sensors that accurately detect a rotation angle of a motor (particularly, a brushless motor), a resolver that detects a rotation angle of a rotor (rotor) with respect to a stator (stator) is known. For example, Patent Literature 1 discloses a resolver in which a coil portion is thinned by using a sheet coil. In addition, Patent Literature 2 discloses an inductive sensor including a resolver, and this inductive sensor is formed in two forms in which patterns of coils of a rotor match each other.

CITATION LIST

Patent Literature

Patent Literature 1: JP-A-2017-90431
Patent Literature 2: JP-A-2019-200106

SUMMARY OF INVENTION

Technical Problem

Since the information on the rotation angle detected by the resolver is used for motor control, the resolver is required to have high angle detection accuracy. However, in the resolver of Patent Literature 1 described above, since the first excitation winding and the second excitation winding having phases of the electrical angle different from each other by 90 degrees in the sheet coil are disposed on one face and the other face of the base material, the number of coils (the number of turns) per layer is small, so that the magnetic flux per layer that the coils generates is weak, and the signal intensity is hardly exhibited. Therefore, there is a problem that it is difficult to improve the angle detection accuracy. On the other hand, signal intensity can be increased by increasing the number of layers, but it is considered that when the number of layers is increased, disadvantages such as an increase in magnetic resistance of a magnetic circuit, a decrease in detection accuracy (distortion of a magnetic field) due to lamination deviation in manufacturing, and an increase in manufacturing cost occur. In addition, in the case of the resolver of Patent Literature 2, since the coil pattern of the rotor coil on the excitation side is formed by the rectangular pattern of two layers, the axial distances between each magnetic pole and the detection coil are different from each other, and there is room for improvement in order to improve the angle detection accuracy.

The present resolver has been devised in view of such a problem, and an object thereof is to improve angle detection accuracy. It is to be noted that the present invention is not limited to these objects, and it is another object of the present invention to achieve operational effects that are derived from each configuration illustrated in Description of Embodiments described later and cannot be obtained by the conventional technique.

Solution to Problem

A resolver according to the disclosure detects a rotation angle of a rotor with respect to a stator, and includes an excitation coil provided at the rotor or the stator and formed on a sheet-shaped substrate, and a detection coil provided at the rotor or the stator and formed on the sheet-shaped substrate. At least one of the excitation coil and the detection coil includes a sine coil and a cosine coil to which AC signals having phases of the electrical angle different from each other by 90 degrees are input. In the sine coil, sine coil patterns of a pair of comb-shaped closed coils connected to each other to form a magnetic pole are disposed on the identical layer of the substrate. In the cosine coil, cosine coil patterns of a pair of comb-shaped closed coils connected to each other to form a magnetic pole are disposed on the identical layer of the substrate. Each pair of comb-shaped closed coils has a first comb-shaped closed coil and a second comb-shaped closed coil. The first comb-shaped closed coil is formed by routing the conductor so as to have a shape in which an arc portion along an outer circle around the rotation center of the rotor and a first projection extending from an arc along the arc portion toward an arc of the inner circle located radially inside the outer circle around the rotation center are combined. The second comb-shaped closed coil is formed by routing the conductors so as to have a shape combining an arc portion along the inner circle and a second projection extending from an arc along the arc portion toward an arc of the outer circle.

Advantageous Effects of Invention

According to the resolver of the disclosure, the signal intensity per layer can be improved, the difference in signal intensity can be reduced, and the angle detection accuracy can be enhanced.

DESCRIPTION OF EMBODIMENTS

1. First Embodiment

[A. Overall Configuration]

Figure 1:
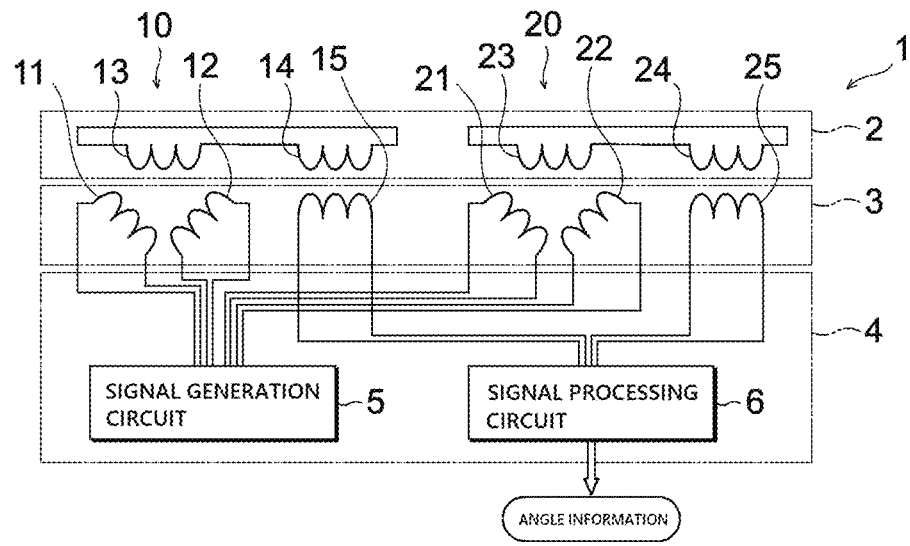
FIG. 1 is a schematic diagram illustrating a structure of a resolver according to the first embodiment.

FIG. 1 is a schematic diagram illustrating a configuration of a resolver 1 according to a first embodiment. Resolver 1 of the present embodiment is a two-phase excitation single-phase output detector, and is a modulated wave resolver that receives an amplitude-modulated AC signal and detects a rotation angle from a phase-modulated signal using the amplitude-modulated AC signal. The resolver 1 includes a rotor 2 (rotor), a stator 3 (stator), and a control device 4, and detects a rotation angle of the rotor 2 with respect to stator 3. The rotor 2 is pivotally supported by the stator 3 so as to be rotatable about the rotation center C, and the stator 3 is fixed to a casing (not illustrated). Each of the rotor 2 and the stator 3 is provided with a plurality of sheet coils formed in a sheet shape.

The control device 4 calculates and outputs a rotation angle of the rotor 2 with respect to the stator 3. The control device 4 includes a signal generation circuit 5 that generates an AC signal supplied to the sheet coil, and a signal processing circuit 6 that outputs angle information corresponding to a rotation angle based on an AC signal returned from the sheet coil. The AC signal generated by the signal generation circuit 5 is transmitted from the stator 3 side to the rotor 2 side by electromagnetic induction, then returned from the rotor 2 side to the stator 3 side, and input to the signal processing circuit 6.

The rotor 2 and the stator 3 of the resolver 1 illustrated in FIG. 1 are provided with a first coil group 10 and a second coil group 20 disposed coaxially with the rotation center C. The first coil group 10 is a coil group including excitation coils 11, 12 and a detection coil 13 having the axial double angle of nX, a transmission antenna coil 14, and a reception antenna coil 15. In other words, the excitation coils 11, 12 and the detection coil 13 of the first coil group 10 are multipolar coils and form n magnetic pole pairs. Note that the value of n representing the axial double angle may be a natural number of 2 or more, and the angular resolution is improved as the value of n is larger.

The second coil group 20 is a coil group including excitation coils 21, 22 and a detection coil 23 having the axial double angle of 1X, a transmission antenna coil 24, and a reception antenna coil 25. The excitation coils 21 and 22 and the detection coil 23 of the second coil group 20 are also multipolar coils, and the number of magnetic pole pairs to be formed is one. The excitation coils 11, 12, 21, and 22 and the reception antenna coils 15 and 25 are provided at the stator 3, and the detection coils 13 and 23 and the transmission antenna coils 14 and 24 are provided at the rotor 2. Hereinafter, when the coils included in the first coil group 10 and the second coil group are distinguished from each other, "first" and "second" are added at the beginning.

AC signals having phases of the electrical angle different from each other by degrees are input to the first excitation coils 11, 12 and the second excitation coils 21, 22. Hereinafter, the first excitation coil 11 and the second excitation coil 21 to which the AC signal of the cosine wave is input are referred to as a first sine excitation coil 11 and a second sine excitation coil 21, and the first excitation coil 12 and the second excitation coil 22 to which the AC signal of the sine wave is input are referred to as a first cosine excitation coil 12 and a second cosine excitation coil 22.

The first detection coil 13 is disposed at a position facing the first sine excitation coil 11 and the first cosine excitation coil 12 in the axial direction of the rotor 2. Similarly, the second detection coil 23 is disposed at a position facing the second sine excitation coil 21 and the second cosine excitation coil 22 in the axial direction of the rotor 2. The first transmission antenna coil 14 is a winding connected in series with the first detection coil 13, and the second transmission antenna coil 24 is a winding connected in series with the second detection coil 23. The first reception antenna coil is disposed at a position facing the first transmission antenna coil 14 in the axial direction of the rotor 2, and the second reception antenna coil 25 is disposed at a position facing the second transmission antenna coil 24 in the axial direction of the rotor 2.

Figure 2:
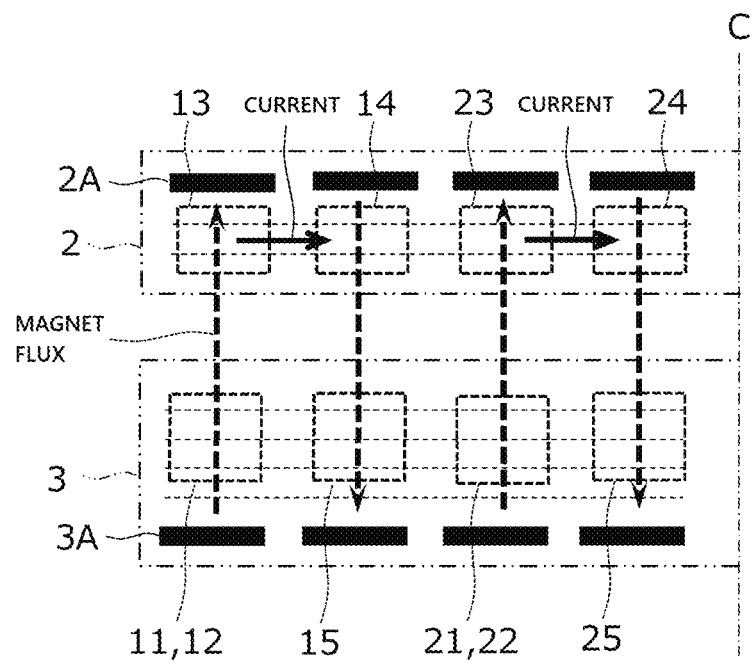
FIG. 2 is a schematic diagram for explaining flows of magnetic fluxes and currents of a rotor and a stator included in the resolver of FIG. 1.

As illustrated in FIG. 2, in the first coil group 10, when an AC signal is input to each of the first sine excitation coil 11 and the first cosine excitation coil 12 provided at the stator 3, excitation occurs to generate a magnetic flux. The magnetic flux interlinks with the first detection coil 13 of the rotor 2 to generate an induced voltage. The first detection coil 13 and the first transmission antenna coil 14 are connected in series, and the first transmission antenna coil 14 is excited by the current of the induced voltage to generate the magnetic flux. This magnetic flux is interlinked with the first reception antenna coil 15 of the stator 3 to generate an induced voltage. The output waveform of the induced voltage is read by the signal processing circuit 6.

The same applies to the second coil group 20. When an AC signal is input to each of the second sine excitation coil 21 and the second cosine excitation coil 22, excitation occurs to generate a magnetic flux, and the magnetic flux interlinks with the second detection coil 23 to generate an induced voltage. The second detection coil 23 and the second transmission antenna coil 24 are connected in series, and the second transmission antenna coil 24 is excited by the current of the induced voltage to generate the magnetic flux. This magnetic flux is interlinked with the second reception antenna coil 25 of the stator 3 to generate an induced voltage. The output waveform of the induced voltage is read by the signal processing circuit 6. The signal processing circuit 6 obtains the rotation angle of the rotor 2 based on the change in phase of the read output waveform of the induced voltage.

[B. Main Part Configuration]

Figure 3:
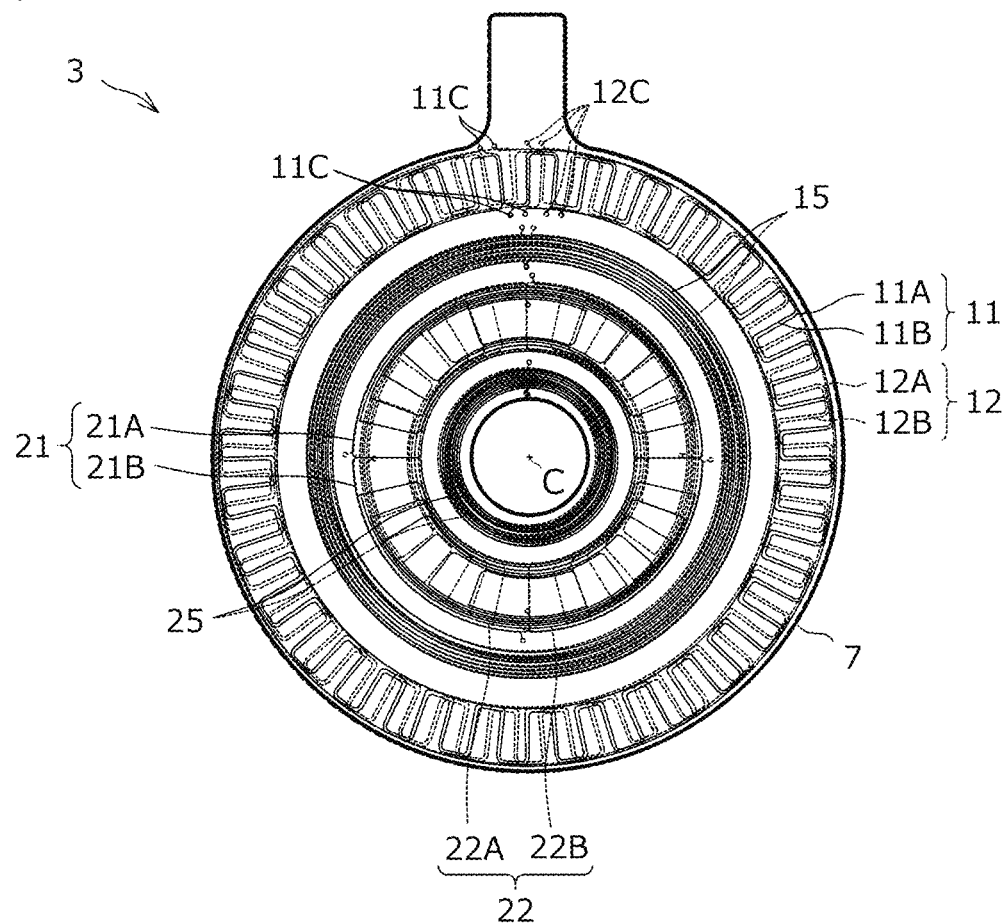
FIG. 3 is a view (plan view) of the stator of FIG. 2 when viewed in the axial direction.
Figure 4:
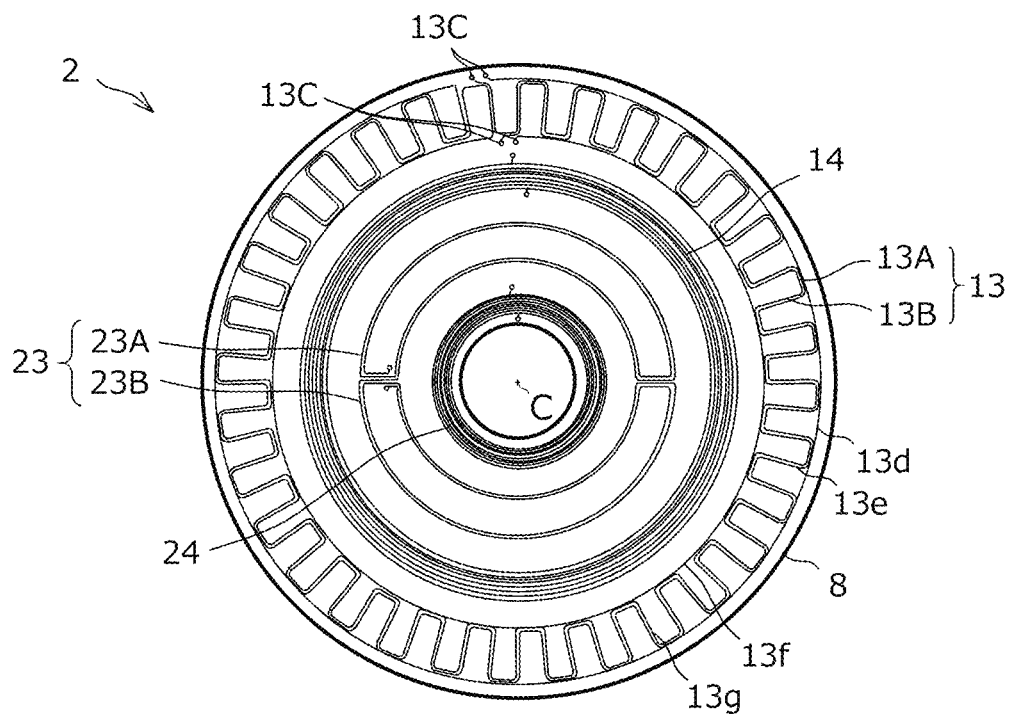
FIG. 4 is a view (plan view) of the rotor of FIG. 2 when viewed in the axial direction.

FIG. 3 is a view of the stator 3 when viewed in the axial direction (hereinafter referred to as a "plan view"), and FIG. 4 is a plan view of the rotor 2. As illustrated in FIG. 3, the stator 3 includes a sheet-shaped substrate 7 having a circular hole at the center, four annular cores 3A (see FIG. 2) having different diameters formed on the substrate 7, and the sheet coils 11, 12, 15, 21, 22, and 25 provided on the cores 3A. In the resolver 1 of the present embodiment, the excitation coils 11, 12, 21, and 22 provided at the stator 3 are the sine coils 11 and 21 and the cosine coils 12 and 22 to which the AC signal is input.

As illustrated in FIG. 4, the rotor 2 includes a sheet-shaped substrate 8 having a circular hole at the center, four annular cores 2A (see FIG. 2) having different diameters formed in the substrate 8, and the sheet coils 13, 14, 23, and 24 provided on the cores 2A. For example, flexible printed circuits (FPCs) are used for the substrate 7 on the fixed side and the substrate 8 on the rotation side, and for example, electromagnetic steel plates or magnetic sheets containing amorphous or ferrite powder are used for the cores 3A and 2A. When the amorphous powder is used, the magnetic flux can be further increased.

Figure 5A:
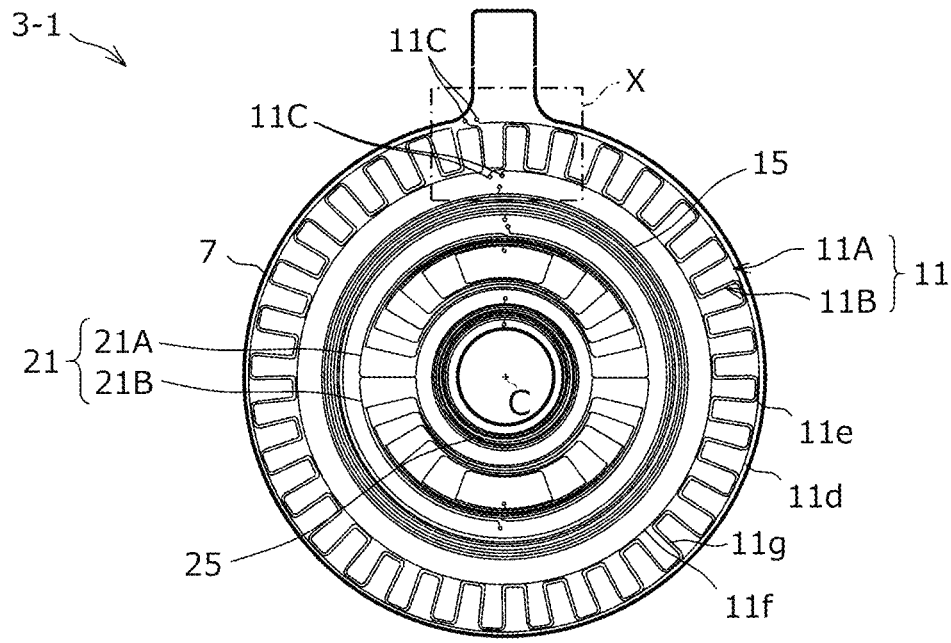
FIGS. 5A and 5B are plan views illustrating layers constituting the stator of FIG. 3.
Figure 5B:
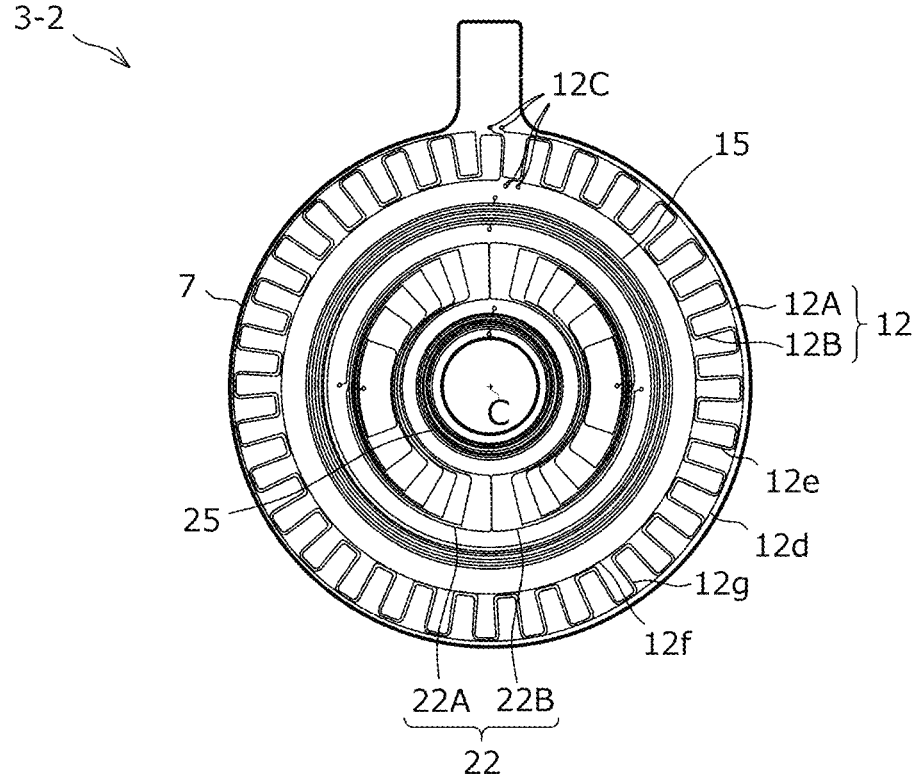

FIGS. 5A and 5B are plan views illustrating the stator 3 of FIG. 3 divided into two layers. As is apparent from this figure, the coil of the stator 3 of the present embodiment includes two layers of stator pieces 3-1 and 3-2. The stator pieces 3-1 and 3-2 are provided on the front face and the back face of one substrate 7, respectively. In other words, the stator piece 3-1 illustrated in FIG. 5A is a plan view of the front face of the substrate 7, and the stator piece 3-2 illustrated in FIG. 5B is a plan view of the back face of the substrate 7. Note that the stator piece 3-2 is seen through from the stator piece 3-1 side.

As illustrated in FIG. 5A, the first sine excitation coil 11, the first reception antenna coil 15, the second sine excitation coil 21, and the second reception antenna coil are disposed in this order from radially outside on the front face (one layer) of the substrate 7. In the first sine excitation coil 11, sine coil patterns of a pair of comb-shaped closed coils 11A and 11B (described later) connected to each other to form a magnetic pole are disposed on the identical layer (the front face in this case) of the substrate 7. The first reception antenna coil 15 is disposed radially inside with a distance from the first sine excitation coil 11, and is formed in a shape in which the conductor is routed so as to spiral around the rotation center C.

The second sine excitation coil 21 is formed in a shape in which the outward coil 21A and the backward coil 21B are linked. For example, the outward coil 21A is formed in a shape in which the conductor is spirally routed in one of the two sections obtained by dividing the annular region into two by a virtual straight line passing through the rotation center C on a plane in which the second sine excitation coil 21 is routed. In addition, the backward coil 21B is formed in a shape in which the conductor is spirally routed in the other of the two sections obtained by dividing the annular regions into two by the virtual straight line. The second reception antenna coil is disposed radially inside with a distance from the second sine excitation coil 21, and is formed in a shape in which the conductor is routed so as to spiral around the rotation center C.

On the other hand, as illustrated in FIG. 5B, the first cosine excitation coil 12, the first reception antenna coil 15, the second cosine excitation coil 22, and the second reception antenna coil 25 are disposed in this order from radially outside on the back face (another layer) of substrate 7. In the first cosine excitation coil 12, cosine coil patterns of a pair of comb-shaped closed coils 12A and 12B (described later) connected to each other to form a magnetic pole are disposed on the identical layer (back face in this case) of the substrate 7. The first reception antenna coil 15 is disposed radially inside with a distance from the first cosine excitation coil 12, and is formed in a shape in which the conductor is routed so as to spiral around the rotation center C.

The second cosine excitation coil 22 is formed in a shape in which the outward coil 22A and the backward coil 22B are linked. The outward coil 22A and the backward coil 22B have shapes obtained by rotating the outward coil 21A and the backward coil 21B by 90 degrees around the rotation center C. The second reception antenna coil 25 is disposed radially inside with a distance from the second cosine excitation coil 22, and is formed in a shape in which the conductor is routed so as to spiral around the rotation center C.

Figure 6:
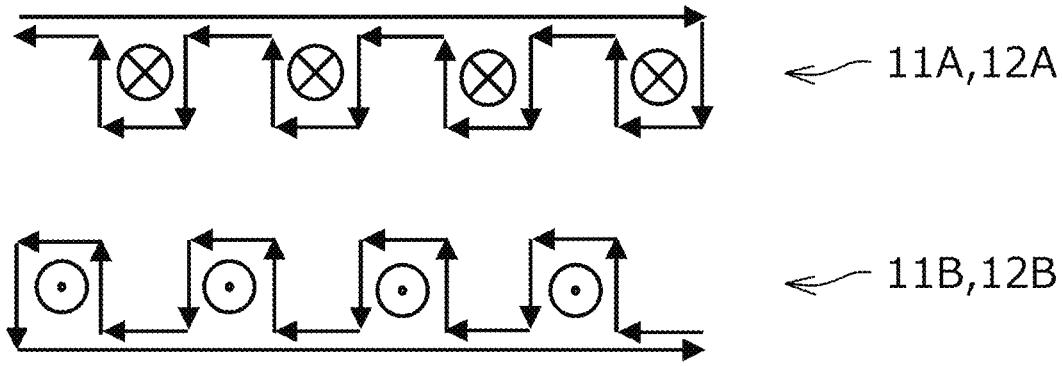
FIG. 6 is a schematic view for explaining a pair of comb-shaped closed coils.

Here, a pair of comb-shaped closed coils 11A and 11B, and a pair of comb-shaped closed coils 12A and 12B (hereinafter also referred to as "comb-shaped closed coil pair") will be described in detail. As illustrated in FIG. 6, the comb-shaped closed coil pair 11A and 11B, and the comb-shaped closed coil pair 12A and 12B are configured by combining two comb-like shapes each of which is obtained by adding a projection shape (for example, a linear rectangular corrugated shape, a curved rectangular corrugated shape, a shape in which corner portions of a rectangular corrugated shape are rounded, and the like) to a portion extending in one direction. Since the comb-shaped closed coil pair 11A and 11B, and the comb-shaped closed coil pair 12A and 12B forming the sine coil pattern and the cosine coil pattern, respectively, have the identical shape except that the phases are shifted from each other, the following description will focus on the comb-shaped closed coils 11A and 11B of the sine coil pattern.

Figure 7:
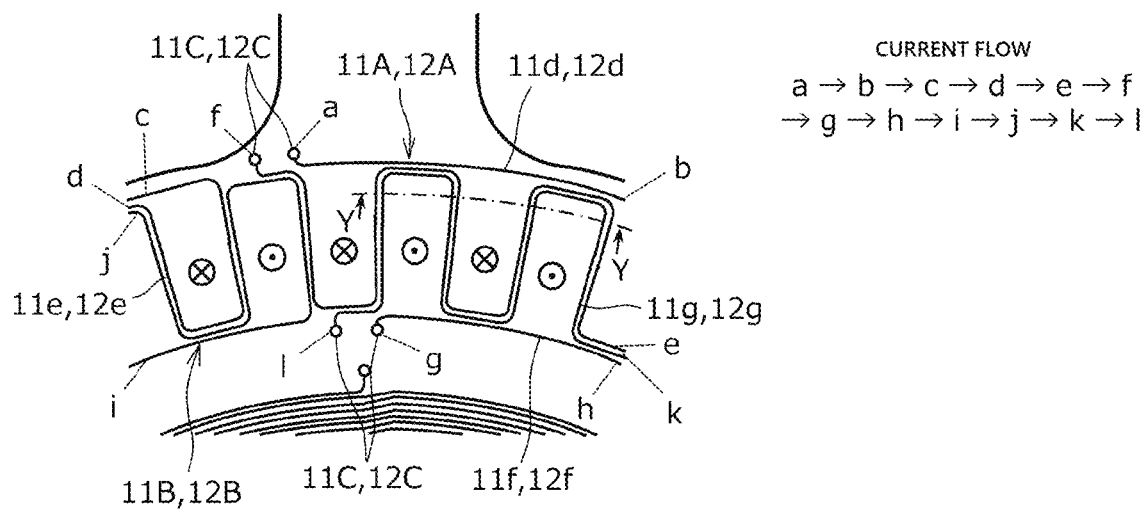
FIG. 7 is an enlarged view of a portion X in FIG. 5A.

As illustrated in FIGS. 5A and 7, the pair of comb-shaped closed coils 11A and 11B includes a first comb-shaped closed coil 11A and a second comb-shaped closed coil 11B. The comb-shaped closed coils 11A and 11B have arc portions $11d$ and $11f$ extending along the outer circle and the inner circle about the rotation center C, respectively. The outer circle is a circle along the slightly radially inside of the outer peripheral edge of the substrate 7, and the inner circle is a circle located radially inside of the outer circle. Each of the arc portions $11d$ and $11f$ has a shape in which a circle is interrupted around a connection portion 11C. The connection portion 11C is a portion (through hole) that connects the pair of comb-shaped closed coils 11A and 11B to each other through the pattern on the back face of the substrate 7, and is disposed on the layer identical to that of the sine coil pattern (that is, the front face of the substrate 7).

The first comb-shaped closed coil 11A is formed by routing the conductor so as to have a shape in which the arc portion $11d$ along the outer circle and a first projection $11e$ extending from the arc along the arc portion $11d$ toward an arc of the inner circle are combined. The first projection $11e$ is a portion formed in a linear or curved rectangular corrugated shape or a substantially rectangular corrugated shape including a straight line and a curved line (the above-described projection shaped portion). The arc portion $11d$ and the first projection $11e$ do not overlap each other, and a slight gap is formed between the curved portion of the first projection $11e$ on the arc portion $11d$ side and the arc portion $11d$. When an alternating current flows through the first comb-shaped closed coil 11A, magnetic fluxes in the identical direction are generated in the entire first projection $11e$. The direction of the magnetic flux fluctuates according to the alternating current.

The second comb-shaped closed coil 11B is formed by routing the conductor so as to have a shape in which an arc portion $11f$ along the inner circle and a second projection $11g$ extending from the arc along the arc portion $11f$ toward an arc of the outer circle are combined. As in the first projection $11e$, the second projection $11g$ is a portion formed in a linear or curved rectangular corrugated shape or a substantially rectangular corrugated shape including a straight line and a curved line (the above-described projection shaped portion). The arc portion $11f$ and the second projection $11g$ do not overlap each other, and a slight gap is formed between the curved portion of the second projection $11g$ on the arc portion $11f$ side and the arc portion $11f$. The second projection 11g of the second comb-shaped closed coil 11B is disposed radially inside along the first projection 11e of the first comb-shaped closed coil 11A with a slight gap. When an alternating current flows through the second comb-shaped closed coil 11B, magnetic fluxes in the identical direction are generated in the entire second projections 11g. Note that the direction of the magnetic flux is opposite to that of the first comb-shaped closed coil 11A, and varies according to the alternating current.

The current flow is as shown in FIG. 7. That is, the current input to the connection portion 11C (a in the figure) provided at the end of the arc portion 11d of the first comb-shaped closed coil 11A flows through the arc portion 11d toward b (clockwise in this case) in the figure, passes through c in the figure, and flows to the first projection 11e. Then, the current flows through the first projection 11e toward d in the figure (counterclockwise), passes through e in the figure, and flows to the connection portion 11C (f in the figure). The first comb-shaped closed coil 11A is described in the above. The connection portion 11C (f in the figure) is connected to the connection portion 11C (g in the figure) of the second comb-shaped closed coil 11B.

Figure 8:
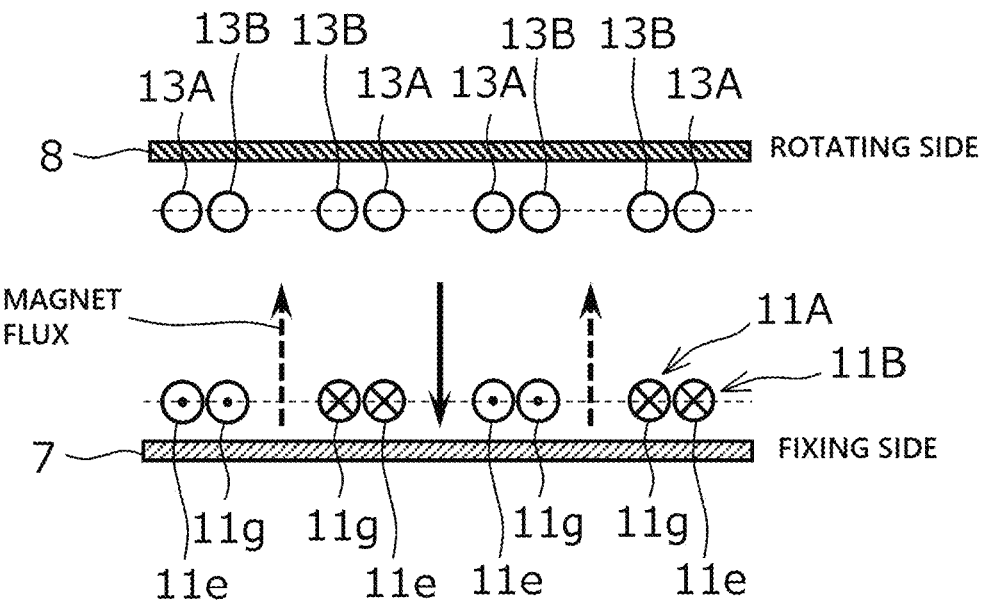
FIG. 8 is a schematic cross-sectional view of the rotor and the stator taken along line Y-Y in FIG. 7.

The current input to the connection portion 11C (g in the figure) flows through the arc portion 11f toward h in the figure (clockwise in this case), passes through i in the figure, and flows to the second projection 11g. Then, the current flows through the second projection 11g toward j (counterclockwise) in the figure, passes through k in the figure, and flows to the connection portion 11C (1 in the figure). The second comb-shaped closed coil 11B is described in the above. Due to such a flow of the current, as illustrated in FIG. 8, a magnetic flux is generated in the comb-shaped closed coils 11A and 11B, and the magnetic flux is interlinked with the first detection coil 13 of the rotor 2 to generate a current.

As described above, the pair of comb-shaped closed coils 11A and 11B and the pair of comb-shaped closed coils 12A and 12B are configured in the similar manner.

That is, as illustrated in FIGS. 5B and 7, the pair of comb-shaped closed coils 12A and 12B includes a first comb-shaped closed coil 12A and a second comb-shaped closed coil 12B. The comb-shaped closed coils 12A and 12B have arc portions 12d and 12f extending along the outer circle and the inner circle about the rotation center C, respectively. Each of the arc portions 12d and 12f has a shape in which a circle is interrupted around the connection portion 12C. The connection portion 12C is a portion (through hole) that connects the pair of comb-shaped closed coils 12A and 12B to each other through the pattern on the back face of the substrate 7, and is disposed on the layer identical to that of the cosine coil pattern (that is, the back face of the substrate 7).

The first comb-shaped closed coil 12A is formed by routing the conductor so as to have a shape in which the arc portion 12d along the outer circle and a first projection 12e extending from the arc along the arc portion 12d toward an arc of the inner circle are combined. The second comb-shaped closed coil 12B is formed by routing the conductor so as to have a shape in which the arc portion 12f along the inner circle and a second projection 12g extending from the arc along the arc portion 12f toward an arc of the outer circle are combined.

Next, the configuration of the rotor 2 will be described in detail. As illustrated in the plan view of FIG. 4, the first detection coil 13, the first transmission antenna coil 14, the second detection coil 23, and the second transmission antenna coil 24 are disposed in this order from radially outside on one layer (for example, the front face) of the substrate 8. The first detection coil 13 includes a coil pattern of a pair of comb-shaped closed coils 13A and 13B connected to each other to form a magnetic pole. The comb-shaped closed coil pair 13A and 13B is patterned as in the comb-shaped closed coil pair 11A and 11B, and the comb-shaped closed coil pair 12A and 12B of the stator 3 disposed to face each other, and includes a first comb-shaped closed coil 13A and a second comb-shaped closed coil 13B.

The comb-shaped closed coils 13A and 13B have arc portions 13d and 13f extending along the outer circle and the inner circle about the rotation center C, respectively. Each of the arc portions 13d and 13f has a shape in which a circle is interrupted around the connection portion 13C. The connection portion 13C is a portion (through hole) that connects the pair of comb-shaped closed coils 13A and 13B to each other through the pattern on the back face of the substrate 8, and is disposed on the layer identical to that the coil pattern (for example, the front face of the substrate 8).

The first comb-shaped closed coil 13A is formed by routing the conductor so as to have a shape in which the arc portion 13d along the outer circle and a first projection 13e extending from the arc along the arc portion 13d toward an arc of the inner circle are combined. The second comb-shaped closed coil 13B is formed by routing the conductor so as to have a shape in which the arc portion 13f along an inner circle and a second projection 13g extending from the arc along the arc portion 13f toward an arc of the outer circle are combined. As in the first projection 13e and the second projection 13g, each of the first projection 11e and the second projection 11g is a portion formed in a linear or curved rectangular corrugated shape or a substantially rectangular corrugated shape including a straight line and a curved line.

The first transmission antenna coil 14 is disposed radially inside with a distance from the first detection coil 13, and is formed in a shape in which the conductor is routed so as to spiral around the rotation center C. The second detection coil 23 is formed in a shape in which an outward coil 23A and a backward coil 23B are linked. For example, the outward coil 23A is formed in a shape in which the conductor is spirally routed in one of the two sections obtained by dividing the annular region into two by a virtual straight line passing through the rotation center C on a plane in which the second detection coil 23 is routed. In addition, the backward coil 23B is formed in a shape in which the conductor is spirally routed in the other of the two sections obtained by dividing the annular regions into two by the virtual straight line. The second transmission antenna coil 24 is disposed radially inside with a distance from the second detection coil 23, and is formed in a shape in which the conductor is routed so as to spiral around the rotation center C.

Figure 9A:
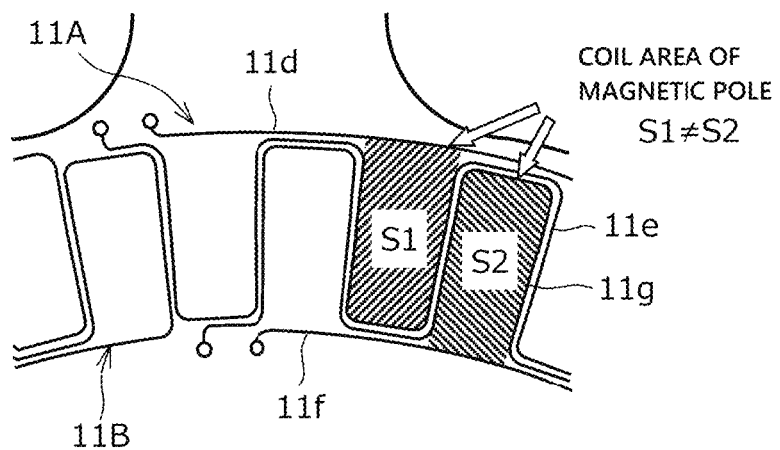
FIGS. 9A to 9C are views illustrating coil patterns of a comb-shaped closed coil (views corresponding to FIG. 7).

In the resolver 1 of the present embodiment, two comb-shaped closed coil pairs (sine excitation coil 11, cosine excitation coil 12) are provided at the stator 3, and one comb-shaped closed coil pair (detection coil 13) is provided at the rotor 2. In the resolver 1 of the present embodiment, the coil areas of the magnetic poles formed by the respective comb-shaped closed coil pairs are different from each other, but may be equal to each other. As illustrated in FIG. 9A, for example, in the first sine excitation coil 11, the coil area (magnetic pole area) of the magnetic pole refers to a substantially rectangular area S1 surrounded by the outer arc portion 11d and one first projection 11e and a substantially rectangular area S2 surrounded by the inner arc portion 11f and one second projection 11g. Although the description is omitted, the same applies to the other pair of comb-shaped closed coils 12 and 13.

Figure 9B:
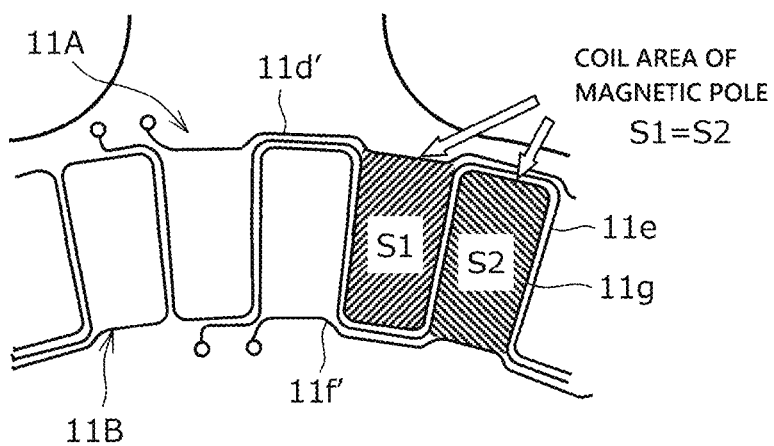
Figure 9C:
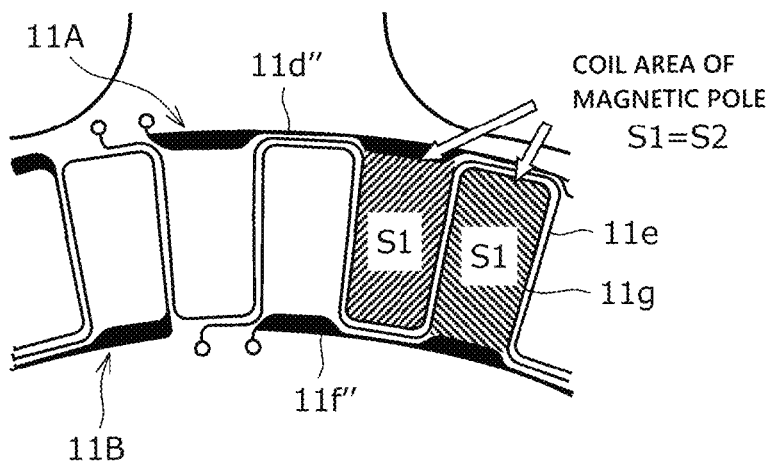

In FIG. 9A, the two areas S1 and S2 are different from each other, but as illustrated in FIGS. 9B and 9C, the two areas S1 and S2 may be equal to each other. In the example shown in FIG. 9B, an outer arc portion 11d' is curved and routed so as to protrude radially inward so as to enter the inside of the first projection 11e, and an inner arc portion 11f' is curved and routed so as to protrude radially outward so as to enter the inside of the second projection 11g. As a result, the two coil areas S1 and S2 are identical. In the example shown in FIG. 9C, an outer arc portion 11d" is formed to be partially thick so as to enter the inside of the first projection 11e, and an inner arc portion 11f" is formed to be partially thick so as to enter the inside of the second projection 11g. As a result, the two coil areas S1 and S2 are identical.

[C. Action and Effect]

(1) According to the resolver 1 described above, since the sine coil (the first sine excitation coil 11 in the present embodiment) and the cosine coil (the first cosine excitation coil 12 in the present embodiment) are formed by the coil patterns of the pair of comb-shaped closed coils 11A and 11B, and the pair of comb-shaped closed coils 12A and 12B, the sine coil 11 can be completed in the identical layer of the substrate 7, and similarly, the cosine coil 12 can be completed in the identical layer of the substrate 7.

Therefore, for example, as compared with a conventional resolver in which one sine coil is formed by two layers and one cosine coil is formed by another two layers, lamination deviation in manufacturing can be reduced, so that a coil pattern can be formed with high accuracy. Furthermore, as illustrated in FIG. 8, the pair of comb-shaped closed coils 11A and 11B constituting the sine coil is disposed on the identical layer of the substrate 7 (for example, the front face of the substrate 7), and the pair of comb-shaped closed coils 12A and 12B constituting the cosine coil is disposed on the identical layer of the substrate 7 (for example, the back face of the substrate 7), so that the axial distance (air gap) to the detection coil 13 of the rotor 2 is identical in each comb-shaped closed coil pair. Therefore, the difference in signal intensity between two magnetic poles having different magnetic flux directions can be reduced, and the angle detection accuracy of the resolver 1 can be enhanced.

Further, according to the resolver 1 described above, since the pair of comb-shaped closed coils 11A and 11B, and the pair of comb-shaped closed coils 12A and 12B include the inward first projections 11e and 12e and the outward second projections 11g and 12g, respectively, the magnetic pole pair can be adjacent to each other in the circumferential direction. Consequently, the distance between each magnetic pole and the rotation center C can be equalized, so that the signal intensity can be made uniform, and the angle detection accuracy of the resolver 1 can further be enhanced.

(2) As illustrated in FIGS. 9B and 9C, in the resolver 1 in which the coil areas S1 and S2 of the magnetic poles formed by the first comb-shaped closed coils 11A and 12A and the second comb-shaped closed coils 11B and 12B are equal to each other, the signal intensities emitted from the coils can be equalized, so that the angle detection accuracy of the resolver 1 can be further improved.

(3) The resolver 1 described above is a modulated wave resolver in which the excitation coils 11, 12, 21, and 22 and the detection coils 13 and 23 are disposed to face the rotor 2 and the stator 3, and is of a two-phase excitation single-phase output type. Then, since the rotation angle is obtained based on the change in phase of the output waveform of the voltage of the first reception antenna coil 15, the accuracy of the output waveform is not limited unlike the resolver that obtains the rotation angle based on the amplitude change, and the angle detection accuracy can be enhanced.

[D. First Modification]

Figure 11:
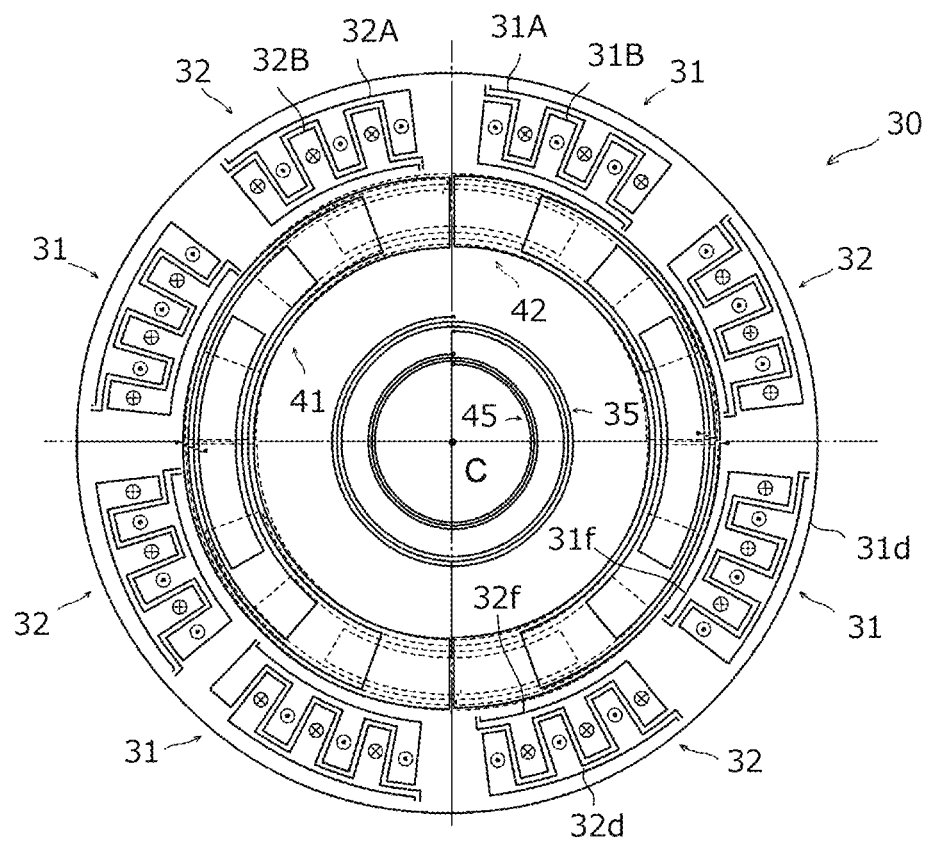
FIG. 11 is a plan view of a stator of a resolver according to the first modification of the first embodiment.

FIG. 11 is a plan view illustrating a stator 30 of the resolver according to the first modification of the first embodiment. Although the rotor of the resolver according to the modification is not illustrated, the rotor and the stator 30 are provided with a first coil group including the excitation coils 31 and 32 and the detection coil having the axial double angle of nX and a second coil group including the excitation coils 41 and 42 and the detection coil having the axial double angle of 1X as in the above embodiment. As in the stator 3, the stator 30 is provided with the first excitation coils 31 and 32 and the second excitation coils 41 and 42, and the first reception antenna coil 35 and the second reception antenna coil 45. As in the rotor 2, the rotor is provided with the first detection coil and the second detection coil, and the first transmission antenna coil and the second transmission antenna coil. In the resolver of the modification, the AC signals having phases of the electrical angle different from each other by 90 degrees are input to the first excitation coils 31, 32 and the second excitation coils 41, 42.

In the first sine excitation coil 31, the sine coil patterns of the pair of comb-shaped closed coils 31A and 31B connected to each other to form the magnetic pole are disposed on the identical layer (the front face in this case) of the substrate. In the first cosine excitation coil 32, the cosine coil patterns of the pair of comb-shaped closed coils 32A and 32B connected to each other to form a magnetic pole are disposed on the identical layer (the front face in this case) of the substrate. However, in the present modification, the plurality of first sine excitation coils 31 and the plurality of first cosine excitation coils 32 (four each in FIG. 11) are provided, and the first sine excitation coils 31 and the first cosine excitation coils 32 are alternately disposed adjacent to each other in the circumferential direction at the facing face at which the rotor and the stator 30 face each other. Further, intervals (widths in the circumferential direction) in the circumferential direction between the magnetic poles included in the first excitation coils 31 and 32 and the first detection coil are identical.

In this way, by disposing first excitation coils 31, 32 on the identical plane, the distance of the first detection coil to each of the first excitation coils 31, 32 can be made uniform, and the signal intensity can be made uniform, so that the angle detection accuracy of the resolver can be improved. By equalizing the widths (widths in the circumferential direction) of the magnetic poles of the first excitation coils 31 and 32 and the first detection coil, the magnetic flux generated by the first excitation coils 31 and 32 can efficiently act on the first detection coil. That is, it is possible to increase the induced voltage and the excitation current of the first detection coil, and it is easy to increase the peak of the output signal to acquire a signal waveform having a desired shape. Therefore, the angle error can be reduced with a simple configuration, and the detection performance of the rotation angle can be improved.

In the resolver of the present modification, each of the arc portions 31d, 31f, 32d, and 32f of the pair of comb-shaped closed coils (sine coil, cosine coil) including the first comb-shaped closed coils 31A and 32A and the second comb-shaped closed coils 31B and 32B does not have a shape in which part of a circle is interrupted, but has an arc shape with a central angle of about 40 degrees. In the resolver illustrated in FIG. 11, a region where each of the first sine excitation coil 31 and the first cosine excitation coil 32 is disposed (a region surrounded by an inner circle, an outer circle, and two straight lines extending in the radial direction passing through rotation center C) has a shape obtained by dividing the annular ring into eight equal parts in the circumferential direction and a partial annular shape. In other words, the first sine excitation coil 31 and the first cosine excitation coil 32 are disposed in the partial annular region at the facing face, and are disposed adjacent to each other so as not to overlap each other in this region. As a result, two (sine coil, cosine coil) comb-shaped closed coil pairs can be disposed on the identical layer, so that it is possible to suppress variations in signal intensity transmitted from the first excitation coils 31 and 32 to the first detection coil, and to improve detection performance.

The number of the first sine excitation coils 31 and the number of the first cosine excitation coils 32 are not limited to four each, but it is preferable that the first sine excitation coils 31 and the first cosine excitation coils 32 are alternately disposed adjacent to each other in respective regions obtained by equally dividing the facing face into an even number. In this case, the number of the first sine excitation coils 31 and the number of first cosine excitation coils 32 are equal to each other, and the signal intensity emitted from each coil can be made uniform, so that the angle detection accuracy of the resolver can be improved.

In the stator 30 illustrated in FIG. 11, the first sine excitation coil 31 and the first cosine excitation coil 32 are routed so as to form a rotationally symmetric shape with respect to the rotation center C on the identical plane. That is, withe the first sine excitation coil 31 and the first cosine excitation coil 32 as one set, four sets are disposed to form a rotationally symmetric shape. As described above, since the first sine excitation coil 31 and the first cosine excitation coil 32 include the identical number of rotationally symmetric coils in which the directions of the magnetic fluxes generated by the excitation are different from each other, the magnetic flux differences due to the coil shapes (comb directions) in the identical phase can be averaged, and the angle detection accuracy of the resolver can be further improved.

The number of pairs (the number of sets) of the first sine excitation coil 31 and the first cosine excitation coil 32 will be supplementarily described. In a case where the number of sets is set to one set or two sets, the balance between the left half face and the right half face tends to deteriorate in the annular region where the first excitation coils 31 and 32 are disposed in FIG. 11, and the robustness as a detector decreases. Therefore, the number of sets is preferably three or more. When the number of sets is set to an odd number, the numbers of the first sine excitation coils 31 and the first cosine excitation coils 32 are different in the left half face and the right half face. Therefore, more preferably, the number of sets is an even number. However, when the number of sets is excessively increased, a large space is taken up in the gap between the first excitation coils 31 and 32 illustrated in FIG. 11, which is disadvantageous particularly in a resolver having a small diameter. In consideration of these points, the number of sets of the first sine excitation coil 31 and the first cosine excitation coil 32 illustrated in FIG. 11 is set to four.

The first sine excitation coil 31 and the first cosine excitation coil 32 may be shifted to positions where the phases of the electrical angle are identical. For example, the first excitation coils 31, 32 may be shifted to a position different from the rotationally symmetric position by 360 degrees in the electrical angle (that is, a mechanical angle for one pole pair) in the circumferential direction. As described above, by moving the positions of the first excitation coils 31, 32 by N cycles in the electrical angle in the circumferential direction (Specifically, moving by one cycle or two cycles in the electrical angle), the gap between the first excitation coils 31, 32 can be widened, and the lead wire from the inner peripheral side can be easily routed in the identical plane through the gap. That is, the distribution of the magnetic flux generated on the first excitation coils 31 and 32 can be optimized and the appropriate output signal can be induced on the first detection coil by providing a start end and a terminal end of one of the adjacent coils having the wider gap at the positions that are shifted from positions of a start end and a terminal end of the other of the adjacent coils in an electrical angle by N cycles in the identical phase. The dimension of the gap is set to be equal to or larger than a dimension corresponding to at least 180 degrees (that is, a mechanical angle corresponding to 0.5 pole pair, which is one magnetic pole) in an electrical angle.

[E. Second Modification]

Figure 12:
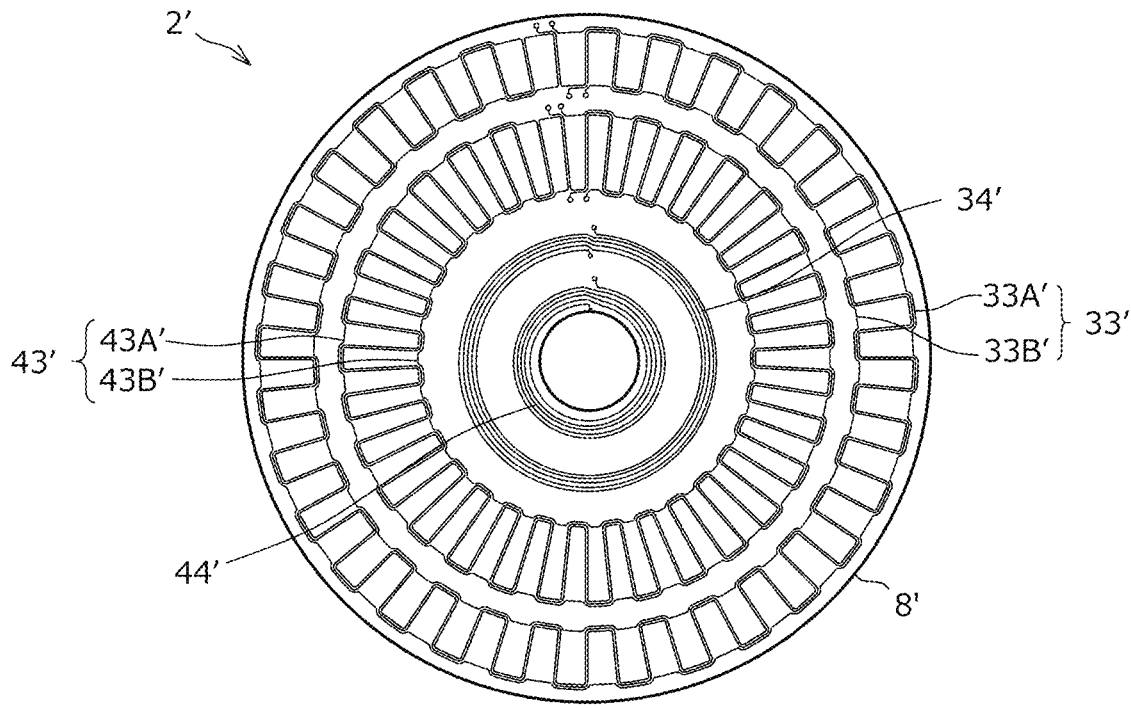
FIG. 12 is a plan view of a rotor of a resolver according to the second modification of the first embodiment.
Figure 13:
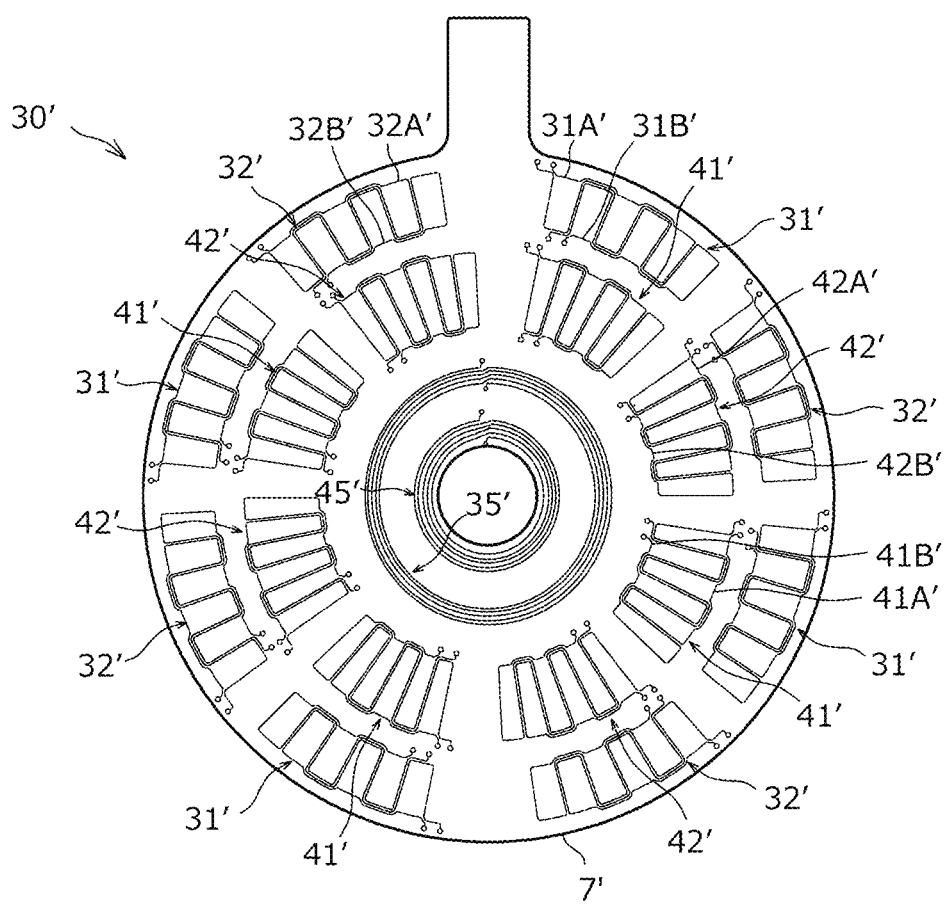
FIG. 13 is a plan view of a stator of a resolver according to the second modification of the first embodiment.

FIGS. 12 and 13 are plan views illustrating a rotor 2' and a stator 30' of the resolver according to the second modification of the first embodiment. The resolver of the present modification is different from the resolver of the above embodiment and the resolver of the first modification in that a multipolar coil is used instead of a coil having an axial double angle of 1X.

The rotor 2' and the stator 30' of the present modification are provided with a first coil group including first excitation coils 31' and 32' and first detection coil 33' having the axial double angle of nX and a second coil group including second excitation coils 41' and 42' and second detection coil 43' having the axial double angle of (n−1)X. In the present modification, the value of n representing the axial double angle is a natural number of 3 or more. The first coil group and the second coil group are provided at different positions in the radial direction. As a result, the first coil group and the second coil group can be disposed on the identical plane, and the signal intensities can be made uniform, so that the angle detection accuracy can be improved. In the resolver of the modification, since the second coil group is disposed radially inside of the first coil group, the magnetic pole dimension (magnetic pole width) in the circumferential direction can be secured, compared with the reverse configuration (the configuration in which the first coil group is disposed radially inside), so that the detection performance of the rotation angle can be improved.

As illustrated in FIG. 12, the rotor 2' is provided with a first detection coil 33' and a second detection coil 43', and a first transmission antenna coil 34' and a second transmission antenna coil 44'. Each of these four types of coils has an annular shape, and they are disposed on a substrate 8' in this order from radially outside. The first detection coil 33' is disposed at a position facing the first sine excitation coil 31' and the first cosine excitation coil 32' described later in the axial direction of the rotor 2'. The first detection coil 33' includes a coil pattern of a pair of comb-shaped closed coils 33A' and 33B', as in the first detection coil 13 described above.

Further, in the resolver of the present modification, the second detection coil 43' also includes a coil pattern of a pair of comb-shaped closed coils 43A' and 43B', as in the first detection coil 33'. The second detection coil 43' is disposed at a position facing the second sine excitation coil 41' and the second cosine excitation coil 42' described later in the axial direction of the rotor 2'. The radial dimension of the region where the second coil group is disposed is larger than the radial dimension of the region where the first coil group is disposed.

As illustrated in FIG. 13, the stator 30' is provided with the plurality of first excitation coils 31' and 32' and the plurality of second excitation coils 41' and 42', and a first reception antenna coil 35' and a second reception antenna coil 45'. Of these four types of coils, the excitation coils 31', 32', 41', 42' are ring-shaped, and the antenna coils 35', 45' are annular and are disposed in this order from radially outside on the substrate 7'. In the resolver of the modification, AC signals having phases of the electrical angle different from each other by 90 degrees are input to the first excitation coils 31', 32' and the second excitation coils 41', 42'.

The first sine excitation coil 31' includes a coil pattern of a pair of comb-shaped closed coils 31A' and 31B' as in the first sine excitation coil 31 of the first modification, and the first cosine excitation coil 32' includes a coil pattern of a pair of comb-shaped closed coils 32A' and 32B' as in the first cosine excitation coil 32 of the first modification. Further, in the present modification, the second sine excitation coil 41' also includes the coil pattern of the pair of comb-shaped closed coils 41A' and 41B', and the second cosine excitation coil 42' also includes the coil pattern of the pair of comb-shaped closed coils 42A' and 42B'.

In the stator 30' of the present variant, as in the stator 30 of the first variant described above, the first sine excitation coil 31' and the first cosine excitation coil 32' are circumferentially disposed alternately adjacent to each other at the facing face at which the rotor 2' and the stator 30' face each other, and the second sine excitation coil 41' and the second cosine excitation coil 42' are also circumferentially disposed alternately adjacent to each other at the facing face.

In the resolver of the present modification, it is possible to acquire the AC signal obtained through the coils of the two systems having the axial double angles different by 1×, and the phase difference information can be made to correspond to the absolute angle of the rotor 2' on a one-to-one basis. Therefore, the detection performance of the rotation angle can be improved with a simple configuration using the vernier principle. In addition, unlike the above-described embodiment and the first modification, since a multipolar coil is used instead of the coil having the axial double angle of 1×, it is possible to make the coil less susceptible to an external magnetic field. As a result, resistance to magnetic noise can be enhanced, and an increase in detection error can be prevented.

In addition, as compared with the coil having the axial double angle of nX and the coil having the axial double angle of 1×, the difference in the magnetic pole size can be reduced, and the distribution of the strength of the magnetic field can be made substantially uniform. The air gap suitable for the coil having the axial double angle of nX has a value close to that of the air gap suitable for the coil having the axial double angle of (n−1)X. Therefore, the air gap of the first coil group and the air gap of the second coil group can be equalized, and the distribution of the strength of the magnetic field can be easily optimized.

The first excitation coils 31' and 32' having the axial double angle of nX and the second excitation coils 41' and 42' having the axial double angle of (n−1) X may be formed in an annular shape like the stator 3 of the above embodiment. In other words, coils of two systems having axial double angles different from each other by 1× may be applied to the resolver 1 of the embodiment. Even in this case, the detection performance of the rotation angle can be improved with a simple configuration using the vernier principle.

2. Second Embodiment

Figure 14:
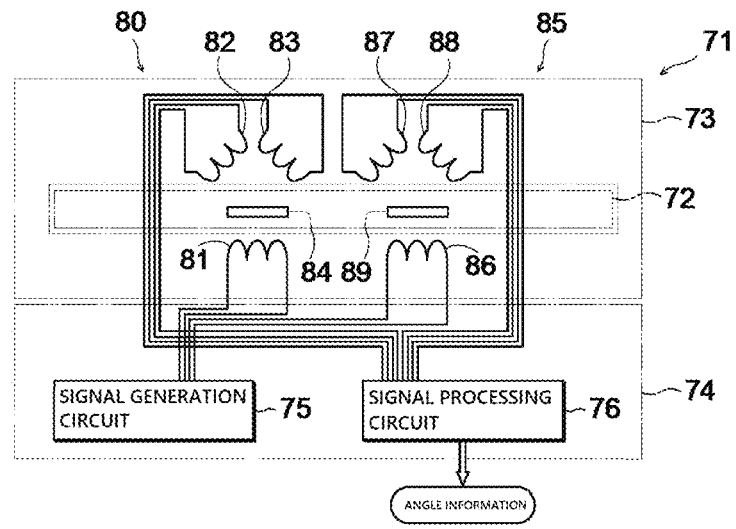
FIG. 14 is a schematic diagram illustrating a structure of a resolver according to the second embodiment.

FIG. 14 is a schematic view illustrating a structure of a resolver 71 according to the second embodiment. The resolver 71 is a single-phase excitation two-phase output resolver 71, and is an inductive resolver (inductive sensor) that receives the AC signal and detects the rotation angle from the amplitude-modulated signal. The resolver 71 includes a rotor 72 (rotor), a stator 73 (stator), and a control device 74. The rotor 72 is a disk-shaped member rotatably supported by the stator 73. The stator 73 is a disk-shaped member fixed to a casing (not illustrated). The stator 73 is provided with excitation coils 81 and 86 and detection coils 82, 83, 87, and 88. On the other hand, the rotor 72 is not provided with a coil, but is provided with conductors 84 and 89.

The control device 74 calculates and outputs a rotation angle of the rotor 72 with respect to the stator 73. The control device 74 incorporates a signal generation circuit 75 that generates an AC signal supplied to the excitation coils 81 and 86, and a signal processing circuit 76 that outputs angle information corresponding to a rotation angle based on signals returned from the detection coils 82, 83, 87, and 88. The AC signal generated by the signal generation circuit 75 is transmitted to the excitation coils 81 and 86, and a predetermined magnetic field is formed in the stator 73. In response to this, eddy currents flow inside the conductors 84 and 89 of the rotor 72, a magnetic field (diamagnetic field) that cancels the magnetic field of the stator 73 is generated, and the magnetic field is shielded. The positions of the conductors 84 and 89 of the rotor 72 change according to the rotation angle. Therefore, a signal amplitude-modulated according to the rotation angle is returned to the detection coils 82, 83, 87, and 88 of the stator 73. This signal is input to the signal processing circuit 76.

The rotor 72 and the stator 73 of the resolver 71 illustrated in FIG. 14 are provided with a first coil group 80 and a second coil group 85. The first coil group 80 is a coil group including an excitation coil and a detection coil having an axial double angle of nX. On the other hand, the second coil group 85 is a coil group including an excitation coil and a detection coil having an axial double angle of 1×. The first coil group 80 and the second coil group 85 are provided at different positions in the radial direction. For example, the second coil group 85 is disposed radially inside the first coil group 80. The second coil group 85 may be disposed radially outside of the first coil group 80.

The excitation coils 81 and 86 (first excitation coil 81, second excitation coil 86) are coils that generate an axial magnetic field between the first excitation coil 81 and the second excitation coil 86. The conductors 84 and 89 (first conductor 84, second conductor 89), of the rotor 72, facing the stator 73 in the axial direction receive the magnetic fields of the excitation coils 81 and 86, and generate eddy currents therein to generate a diamagnetic field that cancels the magnetic fields of the excitation coils 81 and 86. For this reason, the conductors 84 and 89 shield part of the magnetic fields of the excitation coils 81 and 86. For example, an AC signal having a predetermined amplitude is input to the excitation coils 81 and 86. The amplitude of the AC signal input to the excitation coils 81 and 86 can be changed by an instruction by the control device 74. Here, the voltage value of the AC signal input to the excitation coils 81 and 86 is expressed as "sin $\omega_{ct}$". $\omega_{ct}$ is an angular velocity of the AC signal.

The detection coils 82, 83, 87, and 88 detect the magnetic fields of the excitation coils 81 and 86. Since the conductors 84 and 89, of the rotor 72, facing each other in the axial direction move in the circumferential direction with the rotation of the rotor 72, a portion where the conductors 84 and 89 shield the magnetic fields of the excitation coils 81 and 86 change according to the rotor angle. Therefore, the magnetic fields detected by the detection coils 82, 83, 87, and 88 also change according to the rotor angle.

The detection coils 82 and 83 of the first coil group 80 include a first sine detection coil 82 and a first cosine detection coil 83. Similarly, the detection coils 87 and 88 of the second coil group 85 include a second sine detection coil 87 and a second cosine detection coil 88. The first sine detection coil 82 and the second sine detection coil 87 detect the sine of the rotor angle, and the first cosine detection coil 83 and the second cosine detection coil 88 detect the cosine of the rotor angle.

The voltage value of the AC signal obtained by the first sine detection coil 82 whose axial double angle is nX is expressed as "sin (n$\theta$)·sin $\omega_{ct}$", and the voltage value of the AC signal obtained by the first cosine detection coil 83 is expressed as "cos (n$\theta$)·sin $\omega_{ct}$" where the rotor angle is $\theta$. Similarly, the voltage value of the AC signal obtained by the second sine detection coil 87 whose axial double angle is 1× is expressed as "sin $\theta$·sin $\omega_{ct}$", and the voltage value of the AC signal obtained by the second cosine detection coil 88 is expressed as "cos $\theta$·sin $\omega_{ct}$". As described above, since the amplitude of the modulated wave obtained by each of the detection coils 82, 83, 87, and 88 changes according to the change in the rotor angle $\theta$, the rotor angle $\theta$ can be identified based on these amplitudes. A signal detected by each of the detection coils 82, 83, 87, and 88 is input to the control device 74.

Figure 15:
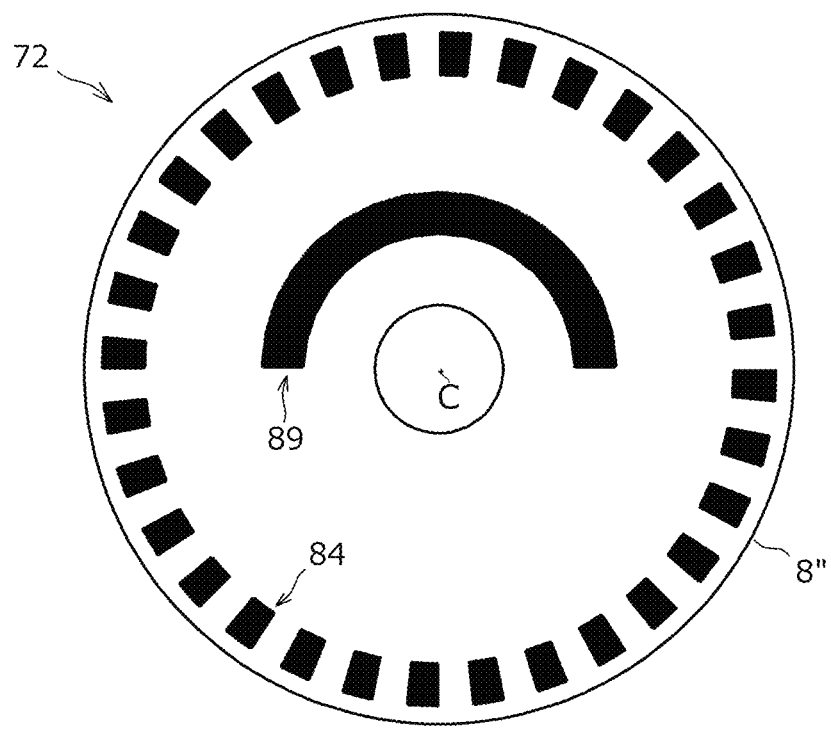
FIG. 15 is a plan view of the rotor of the resolver illustrated in FIG. 14.

FIG. 15 is a diagram illustrating a layout example of the conductors 84 and 89 provided at the rotor 72. The conductors 84 and 89 are formed in shapes in which areas affected by the magnetic fields generated in the excitation coils 81 and 86 change according to the rotation angle of the rotor 72. Specifically, it is formed in a shape (shape in which disk pieces are removed every two disk pieces, and the remaining disk piece is also disposed every two disk pieces) in which the circular ring is divided into many pieces in the circumferential direction and the divided disk pieces are alternately removed along the circumferential direction. The first conductor 84 illustrated in FIG. 15 is a layout example in a case where the axial double angle is 32×. The first conductor 84 has a layout in which annular pieces of the circular ring equally divided into 64 pieces are removed every two pieces and is dispersedly disposed at 32 places in total on the resin plate. In addition, since the axial double angle of the second conductor 89 illustrated in FIG. 15 is 1×, the second conductor 89 has a semicircular ring shape obtained by dividing the ring shape into two in the circumferential direction. Note that the shape of each of the conductors 84 and 89 may not be the "filled shape" as illustrated in FIG. 15, and may be, for example, a "closed ring shape enclosing only the outer periphery".

Figure 16:
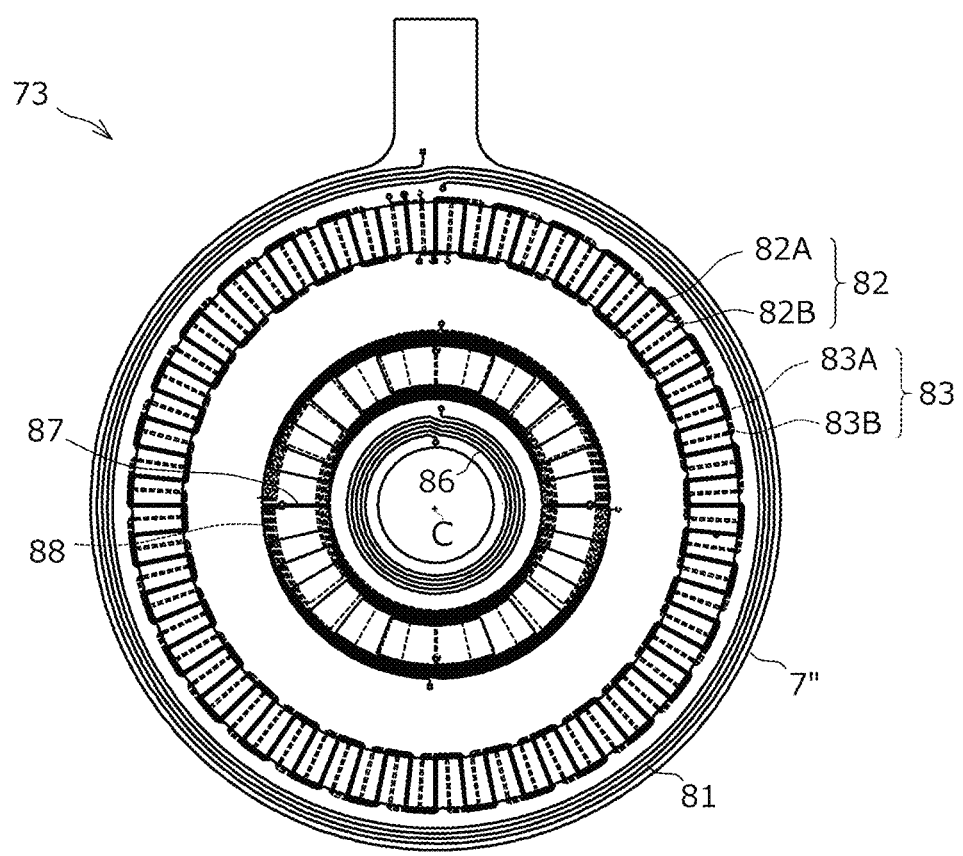
FIG. 16 is a plan view of the stator of the resolver illustrated in FIG. 14.

FIG. 16 is a diagram illustrating a layout example of the first excitation coil 81, the first sine detection coil 82, the first cosine detection coil 83, the second excitation coil 86, the second sine detection coil 87, and the second cosine detection coil 88 provided at the stator 73. Here, the first excitation coil 81 is routed in a shape in which it runs around the outer periphery a plurality of times at the face facing the disk-shaped rotor 72. On the other hand, the second excitation coil 86 is routed in a shape in which it runs around the inner periphery close to the rotation axis C a plurality of times at the facing face. These excitation coils 81 and 86 are not coils dedicated to the first coil group 80 and the second coil group 85, respectively, and collectively function as one excitation coil. In a region outside the first excitation coil 81 and a region inside the second excitation coil 86, magnetic fields that cancel each other are formed. On the other hand, magnetic fields that strengthen each other are formed in a region inside the first excitation coil 81 and outside the second excitation coil 86. As described above, the magnetic fields generated by the two excitation coils 81 and 86 are used in both the first coil group 80 and the second coil group 85. The detection coils 82 and 83 of the first coil group 80 are disposed on the outer peripheral side in the annular region surrounded by the first excitation coil 81 and the second excitation coil 86. On the other hand, the detection coils 87 and 88 of the second coil group 85 are disposed on the inner peripheral side of the annular region.

As illustrated in FIG. 16, the first sine detection coil 82 and the first cosine detection coil 83 are disposed on the front face and the back face of the substrate 7", respectively, at the facing face, of the stator 73, facing the rotor 72. This layout corresponds to the layout of the first sine excitation coil 11 and the first cosine excitation coil 12 in FIG. 3, and each of the first sine detection coil 83 and the first cosine coil 84 includes a pair of comb-shaped closed coils.

In the first sine detection coil 82, the sine coil patterns of a pair of comb-shaped closed coils 82A and 82B connected to each other to form a magnetic pole are disposed on the identical layer (here, the front face) of the substrate 7". In the first cosine detection coil 83, the cosine coil patterns of a pair of comb-shaped closed coils 83A and 83B connected to each other to form a magnetic pole are disposed on the identical layer (back face in this case) of the substrate 7". As in the first embodiment, the comb-shaped closed coil pair 82A and 82B, and the comb-shaped closed coil pair 83A and 83B are configured by combining two comb-shaped shapes each of which is obtained by adding a projection shape to a portion extending in one direction. The comb-shaped closed coil pair 82A and 82B, and the comb-shaped closed coil pair 83A and 83B forming the sine coil pattern and the cosine coil pattern, respectively, have the identical shape except that the phases are shifted from each other.

Each of the first comb-shaped closed coils 82A and 83A is formed by routing the conductor so as to have a shape in which the arc portion along the outer circle and the first projection portion extending from the arc along each arc portion toward the arc of the inner circle are combined. Each of the second comb-shaped closed coils 82B and 83B is formed by routing the conductor so as to have a shape in which the arc portion along the inner circle and the second projection extending from the arc along each arc portion toward the arc of the outer circle are combined. As in the first embodiment, the coil areas of the magnetic poles formed by the first comb-shaped closed coil 82A and the second comb-shaped closed coil 82B may be identical to or different from each other.

As illustrated in FIG. 16, the second sine detection coil 87 and the second cosine detection coil 88 are formed such that the number of turns changes according to the rotation angle of the rotor 72. The relationship between the rotation angle and the number of turns is set so as to correspond to, for example, the relationship between the angle and the amplitude in the sine wave. The phase of the rotation angle at which the number of turns of the second sine detection coil 87 is maximized is set to be different by 90 degrees from the phase of the rotation angle at which the number of turns of the second cosine detection coil 88 is maximized.

In the resolver 71 of the second embodiment, as illustrated in FIG. 16, since the sine coil (the first sine detection coil 82 in the present embodiment) and the cosine coil (the first cosine detection coil 83 in the present embodiment) are formed by the coil patterns of the pair of comb-shaped closed coils 82A and 82B, and the pair of comb-shaped closed coils 83A, and 83B, the sine coil 82 can be completed in the identical layer of the substrate 7", and similarly, the cosine coil 83 can be completed in the identical layer of the substrate 7". Therefore, as in the first embodiment, lamination deviation in manufacturing can be reduced, so that the coil pattern can be formed with high accuracy. Further, axial distances (air gaps) of the detection coils 82 and 83 with respect to the first conductor 84 of the rotor 72 are identical in each comb-shaped closed coil pair. Accordingly, as in the first embodiment, the angle detection accuracy of the resolver 71 can be enhanced.

In the resolver 71 of the present embodiment, the modifications described in the first modification and the second modification of the first embodiment can also be used. That is, a plurality of first sine detection coils and a plurality of first cosine detection coils (for example, four each as in FIG. 11) may be provided so as to correspond to the layout of the first modification, and the first sine detection coils and the first cosine detection coils may be alternately disposed adjacent to each other in the circumferential direction at the facing face at which the rotor and the stator face each other. As in the second modification, the second sine detection coil 87 and the second cosine detection coil 88 may be multipolar coils.

3. Others

The configuration of each resolver described above is an example, and is not limited to the configuration described above. There is no intention to exclude the application of various modifications and techniques that are not explicitly described in the above embodiments and modifications, and the above configurations can be variously modified and implemented without departing from the gist thereof. Furthermore, selection can be made as necessary, or a combination can be made as appropriate.

The shape of the comb-shaped closed coil illustrated in each of the above embodiments and modifications is an example, and the specific coil shape is not limited thereto. For example, the conductors may be routed such that the pair of comb-shaped closed coils forms a single stroke.

Figure 10:
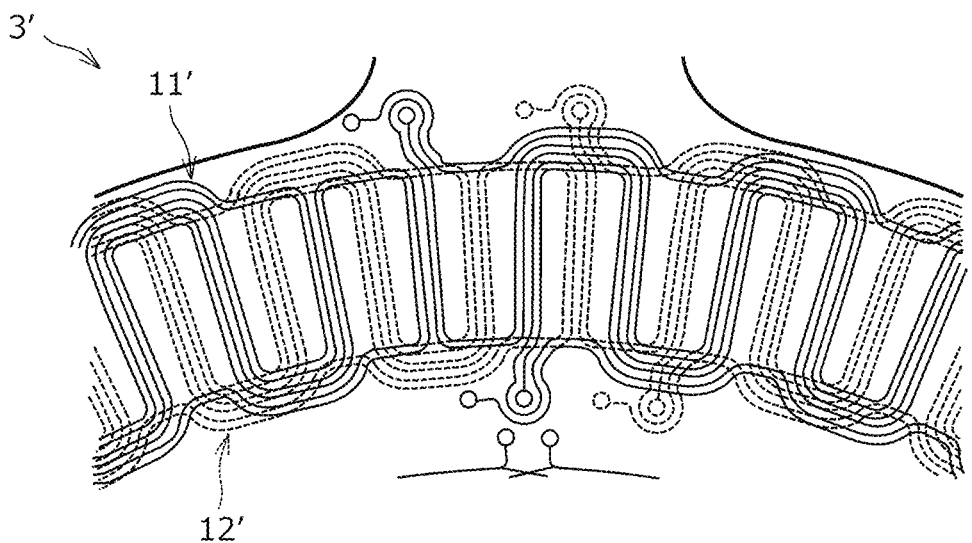
FIG. 10 is a view illustrating another coil pattern of the comb-shaped closed coil.

In addition, for example, as illustrated in FIG. 9C, the thickness of the conductor may be partially changed. With such a configuration, the coil area can be easily adjusted with a simple configuration. In the above embodiment, the coil in which the conductor runs around each magnetic pole once is exemplified, but a coil in which the conductor runs around a plurality of times may be used. The stator 3' illustrated in FIG. 10 has a sine excitation coil 11' and a cosine excitation coil 12' each having a shape (double winding) in which a conductor runs around each magnetic pole twice, and as in FIG. 9B, arc portions of the coils 11' and 12' are curved in a projection shape so that coil areas of the magnetic poles are equal. By increasing the number of turns of the conductor, the magnetic flux density can be increased, and the detection performance of the rotation angle can be improved. Similarly, In the resolver 71 of the second embodiment, the thickness of the conductor may be partially changed, or a coil having a shape in which the conductor is wound a plurality of times may be used.

In the stator 3 of the first embodiment, the stator pieces 3-1 and 3-2 are provided on the front face and the back face of the substrate 7, respectively, a sine coil pattern and a cosine coil pattern may be formed on the two respective substrates 7, and the two substrates 7 may be overlapped (stacked) to constitute one stator 3.

In the first embodiment and the modifications of the first embodiment, the two-phase excitation single-phase output resolver is exemplified, but the similar configuration may be applied to the single-phase excitation two-phase output resolver. In this case, the magnetic flux generated from the one-phase excitation coil provided at the rotor is detected by the sine coil and the cosine coil at the stator. The similar configuration may be applied to the two-phase excitation two-phase output resolver. In this case, the detection coil provided at the rotor and the excitation coil provided at the stator are a sine coil and a cosine coil.

The invention claimed is:

1. A resolver that detects a rotation angle of a rotor with respect to a stator, the resolver comprising:
    an excitation coil provided at the rotor or the stator and formed on a sheet-shaped substrate; and
    a detection coil provided at the rotor or the stator and formed on a sheet-shaped substrate, wherein
    one of the excitation coil and the detection coil includes a sine coil and a cosine coil to which AC signals having phases of an electrical angle different from each other by 90 degrees are input,
    the sine coil has a sine coil pattern of a pair of comb-shaped closed coils connected to each other to form a magnetic pole disposed in an identical layer of the substrate,
    the cosine coil has a cosine coil pattern of a pair of comb-shaped closed coils connected to each other to form a magnetic pole disposed in an identical layer of the substrate, and
    the each pair of comb-shaped closed coils includes
    a first elongate conductor including a first arc portion routed along an outer circle around a rotation center of the rotor and further routed to form a plurality of first projections inside the outer circle extending from the first arc portion toward an inner circle located radially inside the outer circle around the rotation center, and
    a second elongate conductor including a second arc portion routed along the inner circle and further routed to form a plurality of second projections outside the inner circle extending from the second arc portion toward the outer circle.

2. The resolver according to claim 1, wherein
    a coil area of a magnetic pole formed by the first elongate conductor is equal to a coil area of a magnetic pole formed by the second elongate conductor.

3. The resolver according to claim 1, wherein
    the sine coil and the cosine coil are disposed on an identical plane of one substrate.

4. The resolver according to claim 1, wherein
    the sine coil and the cosine coil are disposed on respective opposite faces of one substrate.

5. The resolver according to claim 1, wherein
    the resolver is a modulated wave resolver in which the excitation coil is disposed on one side of the rotor and the stator, and in which the detection coil is disposed on the other side of the rotor and the stator so as to face the excitation coil.

6. The resolver according to claim 5, wherein
the resolver is of a two-phase excitation single-phase output type.

7. The resolver according to claim 6, further comprising:
a signal processing circuit that calculates and outputs the rotation angle, wherein
each of the rotor and the stator includes a sheet-shaped antenna coil provided on the substrate, and
the signal processing circuit obtains the rotation angle based on a change in phase of an output waveform of a voltage of the antenna coil provided at the stator.

8. The resolver according to claim 1, wherein
the excitation coil and the detection coil are both provided at the stator, and
the rotor is an inductive resolver including a conductor that generates a diamagnetic field in a direction of canceling a magnetic field of the excitation coil with a magnitude according to the rotation angle.

* * * * *